Aug. 15, 1967   A. L. POWER   3,335,925
HOSE SUPPORTER ATTACHMENT MACHINE
Filed May 19, 1965   8 Sheets-Sheet 1

FIG-1

INVENTOR.
ANGUS L. POWER
BY
Robert Ames Norton
ATTORNEY

United States Patent Office 3,335,925
Patented Aug. 15, 1967

3,335,925
HOSE SUPPORTER ATTACHMENT MACHINE
Angus L. Power, Medfield, Mass., assignor to United Elastic Corporation, Easthampton, Mass., a corporation of Massachusetts
Filed May 19, 1965, Ser. No. 457,151
7 Claims. (Cl. 223—49)

This invention relates to a machine for automatically attaching a folded elastic web to hose supporters and similar elements.

In the past hose supporter grips having a button, usually of elastic, and a curved metal clamp which fits down thereover to clamp fabric such as stocking over the button have been used extensively. These supporters are provided with a slot through which a double fold of elastic webbing is introduced. This elastic webbing then is sewn onto whatever garment the hose supporter is to be attached. Ordinarily it is necessary to ship the hose supporters in suitable packages, such as a dozen, with the webbing through the slot, as often the garment to which the hose supporter is to be attached is not manufactured by the same concerns who make the elastic webbing; and even if manufacture is in the same organization, they are normally different departments and shipping is still necessary. It will be obvious that after the elastic webbing of predetermined length has passed through the slot of the hose grip it must be folded back smoothly for shipping. In ordinary manufacture the lengths of webbing are introduced by hand through the slot and then are folded back smooth and a package of suitable size fastened with an elastic or other means for maintaining the hose grips with their webbing in position for shipping.

There are a number of drawbacks to this method of operation. In the first place, it requires considerable manual labor, thus increasing labor costs; and this is made more acute by the fact that the webbing is often a close fit in the slot and if slightly oversized slows down the manual insertion. Also, the webbing after being inserted has to be folded back smoothly at the right point, which further slows up manual operation. Also in manual operation, if the operator becomes tired it is very easy for the webbing not to be folded back at precisely the right point with the desired lengths of the two folded back pieces. This then presents a problem to the garment manufacturer or else requires an unnecessarily elaborate inspection system. All of these drawbacks have made the manual operation more costly and less perfect. But up to the present time there has been no satisfactory machine for performing any of these operations, and particularly there has been no machine which is rugged and remains accurately in adjustment over long periods of time. It is with the solution of these problems that the present invention deals; and in its preferred embodiment all operations are mechanical and effected with rugged gears, cams, cam followers, and other metal elements which cannot get out of order and which do not break. In a broader aspect, the invention is not limited to a completely mechanically driven and controlled machine, as it is possible to control certain of the operations by other means, such as electrically, with solenoids, microswitches and the like. All of these, however, introduce further complexities and produce a less rugged machine and, therefore, in a more specific preferred embodiment the all mechanical drive is greatly to be preferred for practical operation.

While the machine will be described in greater detail below, a very brief and somewhat over-simplified description of the operation aids in following the more specific description. Essentially, the machine is provided with an indexing table having a number of indexing depressions, for example twelve. The table is moved in precise steps and at one position a hose grip is inserted into the depression on the table, the feed of the hose grips being either manual or automatic as desired. At another station of the table, elastic web is advanced over the hose supporter to a predetermined length. Then a thin metal plunger moves down and forces the webbing through the slot in the grip until the free end has passed through. The plunger retracts, the web is cut off and is mechanically folded accurately and held in this position through the remaining stations of the indexing table, which finally reaches an end station where the grip with the folded lengths of webbing moves into a container and is held down by spring pressure. After the number of hose supporters for a unit package, for example a dozen, the operator, or a second operator if manual loading is used, removes the package of grips, starts up the machine for another cycle of twelve operations, fastens the package of grips, for example with an elastic band, and places it in a suitable bin.

The speed of operation is very much higher than with manual operation and is limited only by the rate at which grips are fed into the compartment on the indexing table. Even when this is done by hand, it is very much faster than the manual threading of elastic web through the slot of the grip. It is also possible, and is described as a specific modification, to feed the grips automatically.

The invention will be described in greater detail in conjunction with the drawings, in which.

Figure 1:
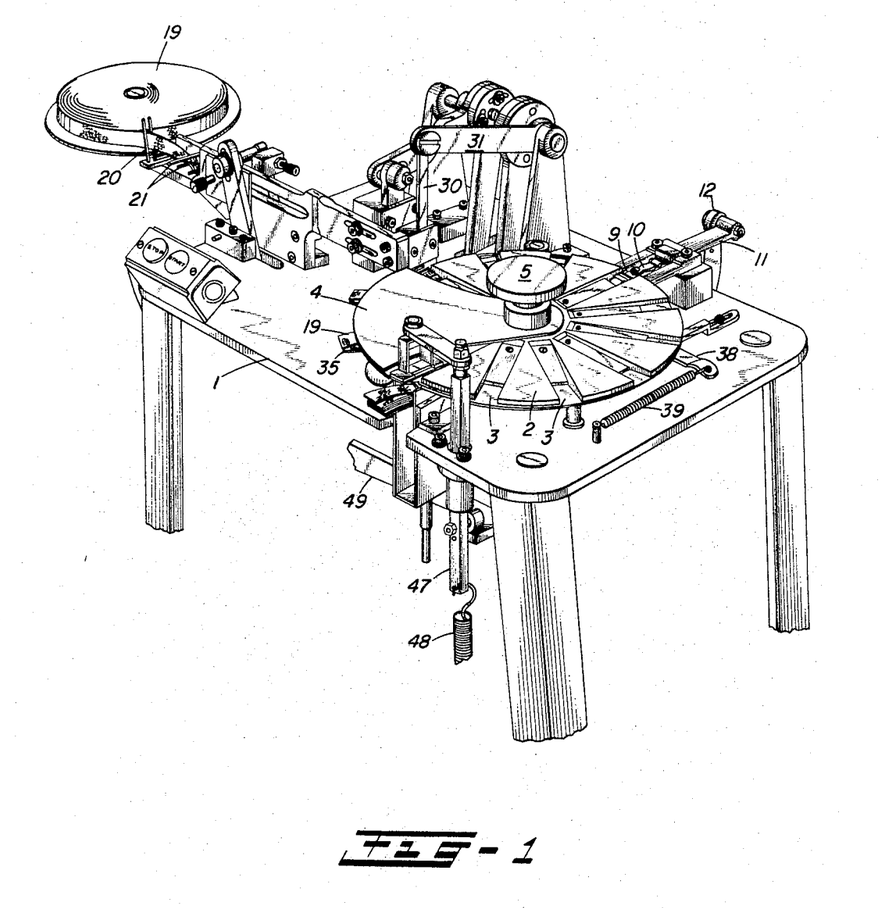
FIG. 1 is an isometric view of the machine.

In FIG. 1 the machine is shown mounted on a table 1 with all of the mechanism on the top exposed. In commercial machines a portion is covered with a cover, which is omitted for clarity.

An indexing table 2 is provided with twelve recesses 3 for receiving grips, the peripheral portions of each recess being open, as can be seen in FIGS. 3 to 6. A cover 4 for a part of the indexing circle is clamped down by a fastening 5. Its function will be described below.

Figure 3:
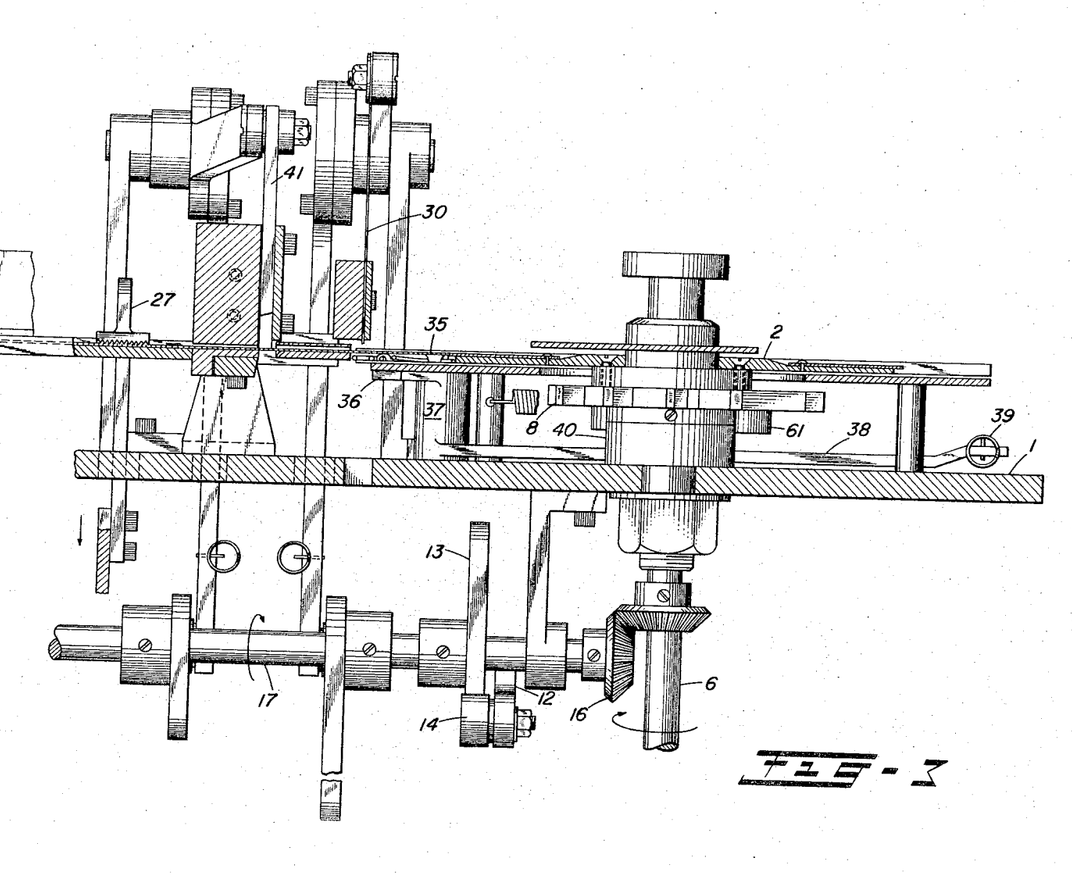
FIG. 3 is a vertical sectioned elevation.
Figure 7:
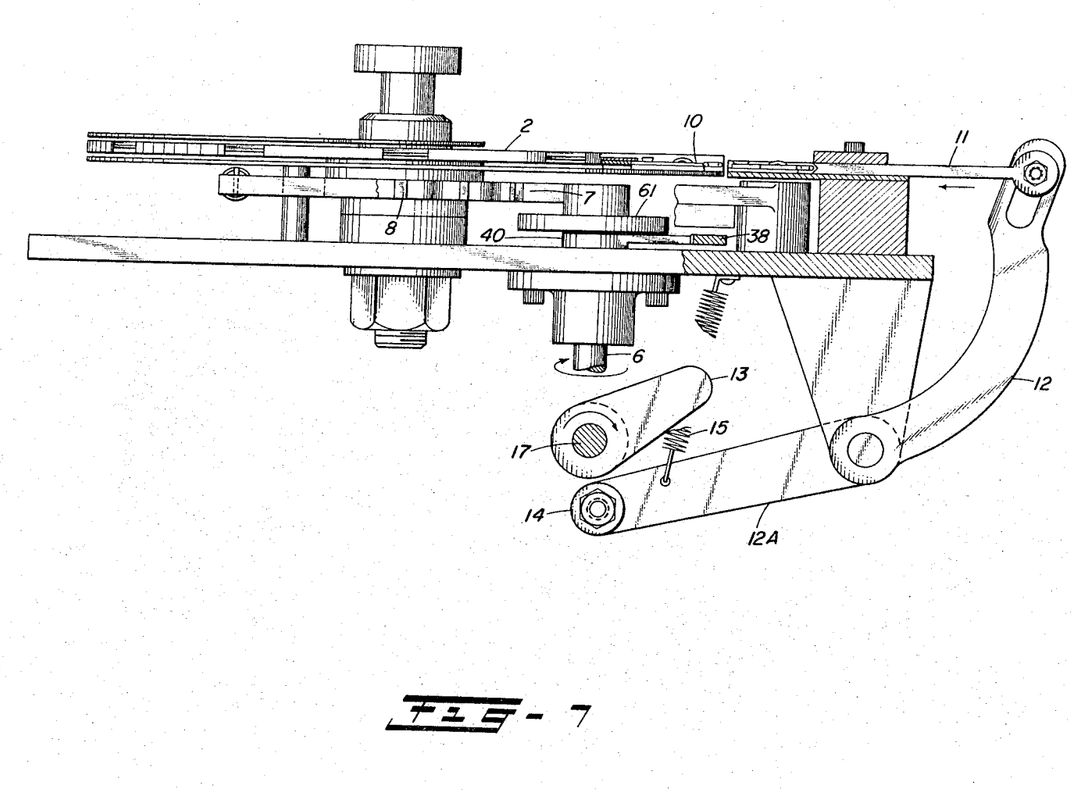
FIG. 7 is a vertical elevation partly in section of the hose supporter feed mechanism.
Figure 8:
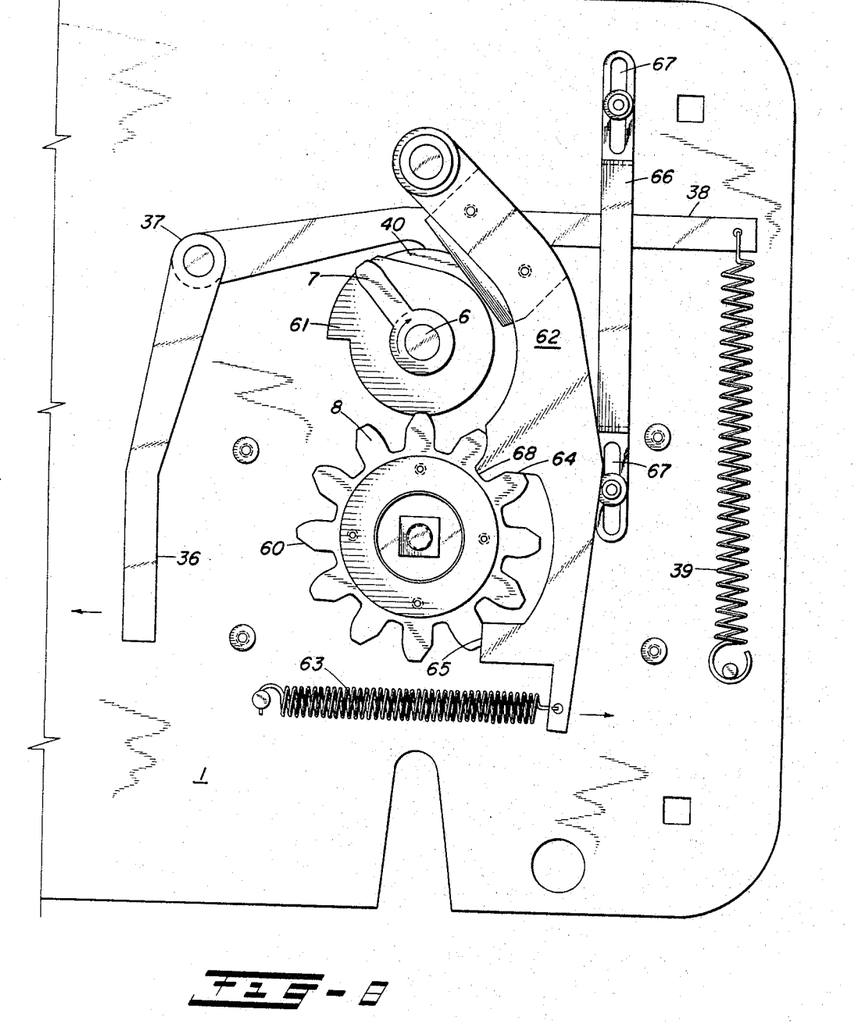
FIG. 8 is a plan view of the table drive.
Figure 9:
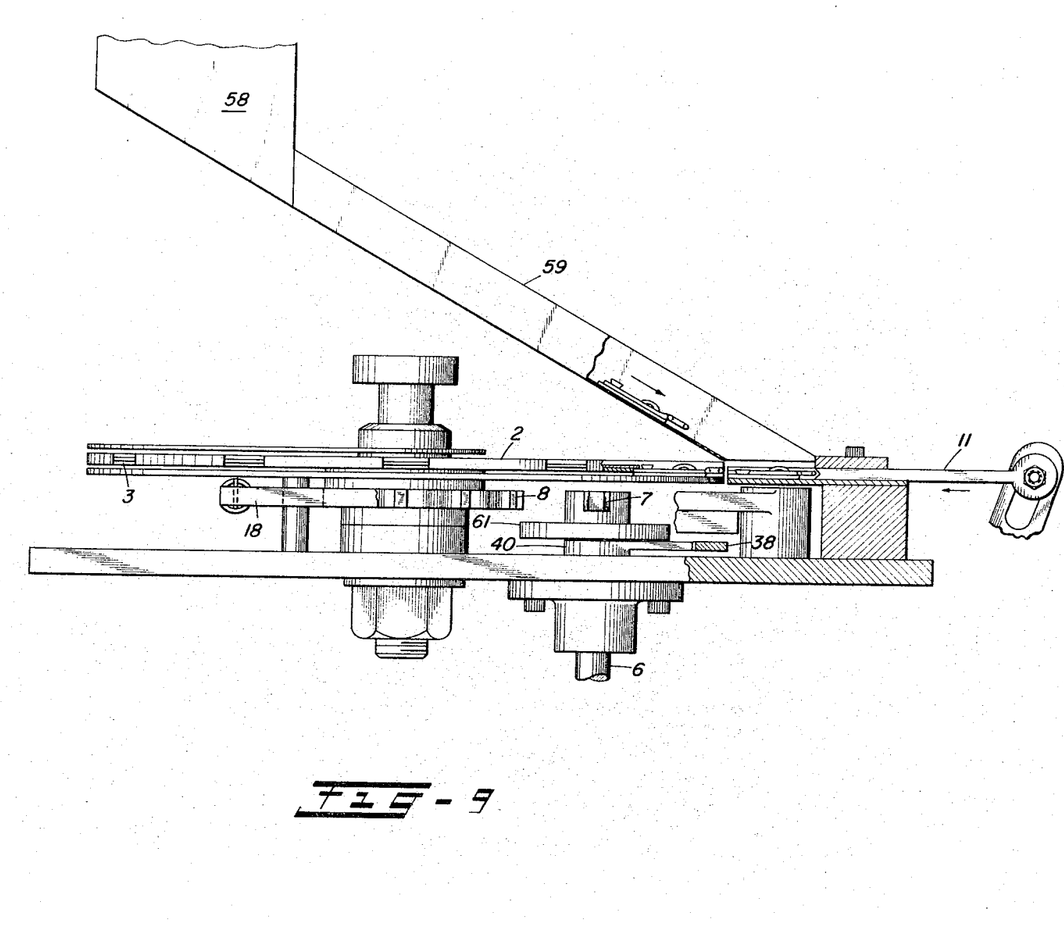
FIG. 9 is a vertical elevation of a modified machine with automatic hose supporter feed.

Drive for the indexing table is most clearly shown in FIG. 8 taken in conjunction with FIG. 3 and also FIGS. 7 and 9. A vertical shaft 6, best shown in FIG. 3, is the principal drive shaft for the whole apparatus. It is turned by a motor (not shown). The shaft turns a one-toothed gear 7 which meshes with a twelve-toothed gear 8 to which the table 2 is attached. The teeth are not symmetrical as is the single tooth 7. On one side the tooth is rounded to substantially the same curve as tooth 7 but on the other side there is a flat portion 60 cut out. A cam 61 on the shaft 6 operates a pivoted detent 62 against a spring 63. This is shown in FIG. 8, the position corresponding to a position of the single-toothed gear 7 after it has moved the twelve-toothed gear 8 one tooth. In this position the spring 63 moves the lever 62 in, and the curved portion of a projection 68 meshes with the curved portion of one of the teeth of the gear 8, whereas a flat portion 64 engages the flat 60 of the next tooth and the flat end 65 of the lever also engages a flat portion 60 of another tooth of the same gear 8. This results in locking the gear 8 in an exact position.

A grip 10 is now placed by the operator feeding the machine into aligning channel 9 and a pusher 11 is actuated by the bell crank 12 when a cam 13 strikes a cam follower 14. Return motion is by the spring 15. The operation is best seen in connection with FIG. 7. Cam 13 is mounted on a shaft 17, driven by the bevel gear 16 from the main shaft 6. The drive can be seen in FIG. 3. The pusher 11 is caused to move in toward the center of the indexing table 2, forcing the hose grip into a compartment 3. In FIG. 1 the machine is shown in the position when the hose grip 10 has just been fed in and just before the pusher 11 is actuated. The same instant is also represented in FIG. 7 and, of the automatic feed modification, in FIG. 9.

Figure 2:
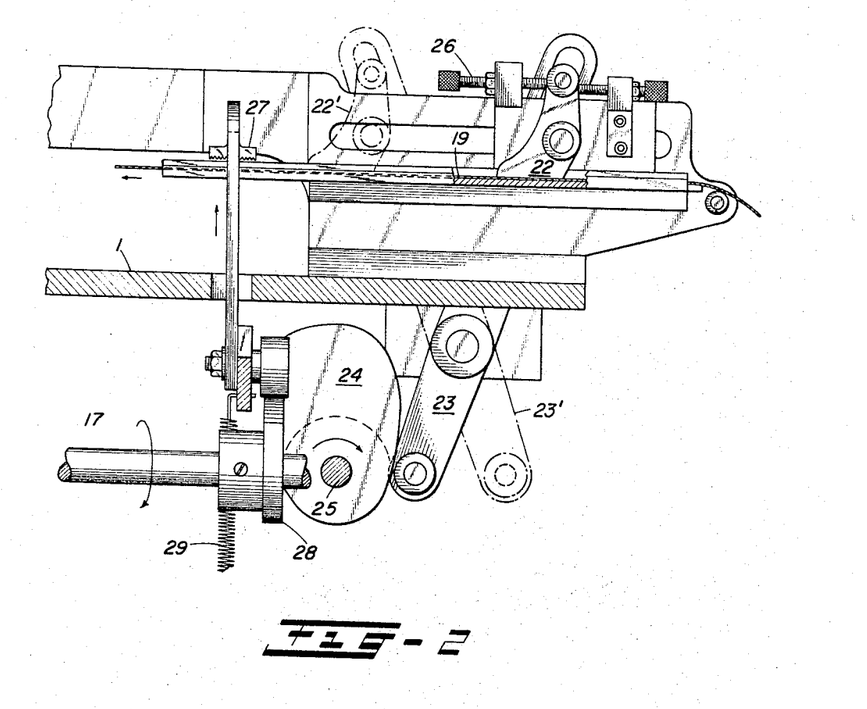
FIG. 2 is a detailed vertical section through the web feeding mechanism.

At each station of the indexing table 2, one grip is held under the web feeding and web inserting mechanism. In FIG. 1 this is the third station from the feed. The webbing 19 is held on a suitable reel and is guided through pins 20 and 21 being turned into the plane of the indexing table. FIG. 2 shows the mechanism for advancing the web, the figure showing the mechanism in two extreme positions. In the first position an advancing member 22 grips the web and is moved to the left by means of the bell crank 23, which in turn is actuated by a cam 24 on a cross shaft 25 driven from the shaft 17 through bevel gears (not shown). This moves the web forward a predetermined distance to the second position shown in FIG. 2. The distance can be varied by moving a stop adjusted by the screw 26 which determines the position of the start of the forward feed of the web. The bell crank 23 is returned to its initial position by a spring (not shown).

As soon as the web has been advanced, a hold-down clamp 27 grips it. This clamp is held down by a spring 29 and is raised by a cam 28 on the shaft 17. The cam is positioned so that the clamp is raised during the forward movement of the web-advancing mechanism 22 so that the web can move freely to the left in FIG. 2. The figure is a view from the rear of the machine as compared to FIG. 1 so that direction of web motion appears reversed. When the hold-down 27 clamps the web it performs two functions: one is that it prevents the web from being moved backward when the web-advancing element 22 is returned to its initial position; the second function is to hold the web tight during the feeding of the web through the slot in the hose supporter and cutting off the web at the right length. These two operations will now be described in conjunction with FIGS. 1, 3, 4, 5 and 8.

Figure 4:
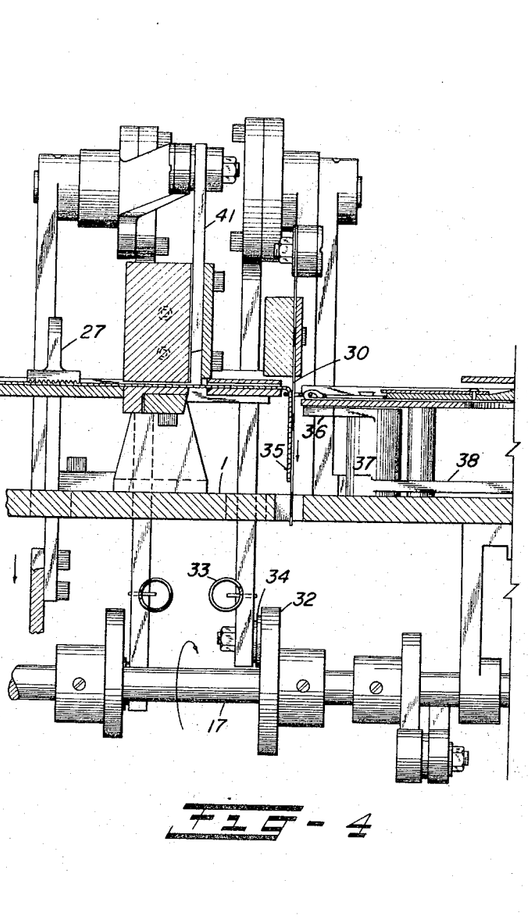
FIGS. 4 and 5 are detail vertical sections through the mechanism for feeding the webbing through the hose supporter slot and folding the latter back.

FIG. 1 shows the position just before the web has been advanced, and FIG. 3 shows the position after advancement and clamping by means of the hold-down 27. As soon as clamped, a thin inserting member 30 is moved down by the bell crank 31, which is actuated by a cam 32 on the shaft 17. Spring 33 holds the end of the bell crank which contacts the cam through its cam follower 34 and serves to retract the bell crank after it has been moved by the cam. FIG. 3 shows the position of the element 30 just before it moves down. FIG. 4 shows it at the end of its downward travel, and FIG. 5 at the end of its return movement. It will be seen that the member 30 pushes the web through the slot until the free end hangs down. This portion of the web is shown at 35. As the member 30 is quite stiff, it exerts sufficient force so that the webbing is fed through the slot of the grip even though the webbing may be very slightly oversized. As was described above, this avoids slowing up of manual operation when webbing of slightly oversize is encountered.

Figure 5:
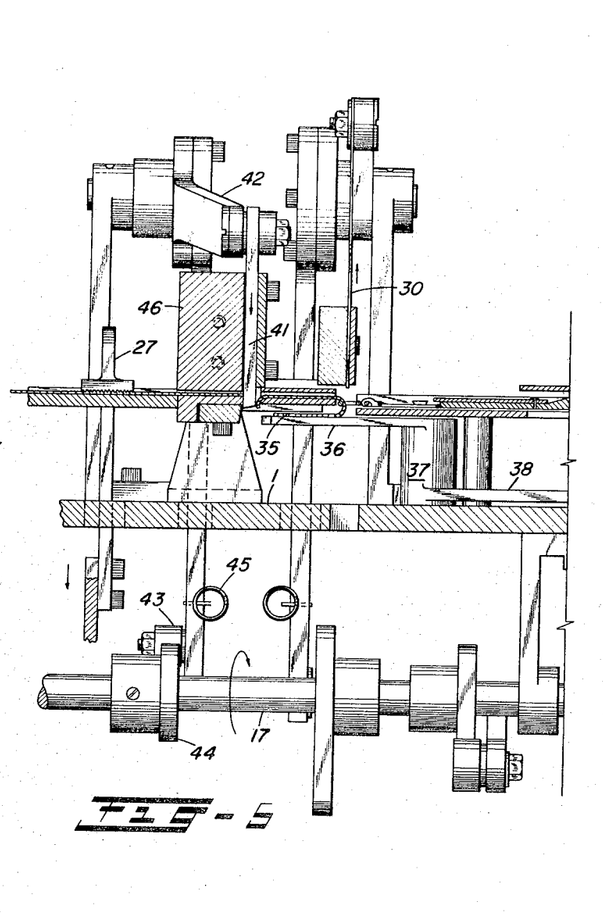

At the end of the operation shown in FIG. 4, a folding finger 36 on a short shaft 37 is moved by rotating the shaft by means of the lever 38 against the spring 39, the movement being effected by the cam 40 on the main shaft 6. The operation of cam 40 normally holds the finger 36 in retracted position. It only moves forward after the operation described above under the force of the spring 39 just before the table 2 is moved to another station. Travel limits are set by the member 66 provided with two slots 67. This is best seen in FIG. 8. This drive is shown in FIGS. 3 and 8, and FIG. 5 shows the finger 36 in full extended position. It will be seen that this has folded the free end 35 of the webbing. Now, a guillotine cutter 41 operated by a bell crank 42 is caused to move down. The bell crank is provided with a cam follower 43 bearing against a cam 44 on the shaft 17 and is held against it by the spring 45. The guillotine cutter, which moves down a passageway in a block 46, severs the web.

As the machine proceeds, table 2 continues to move to the next station, hold-down 27 is raised, as described above, and the cycle of advancing another length of webbing proceeds when the next station comes into position. It will be seen that the two folds of the webbing 19, including the free end 35, are now held against unfolding by the cover 4 shown in FIG. 1.

Figure 6:
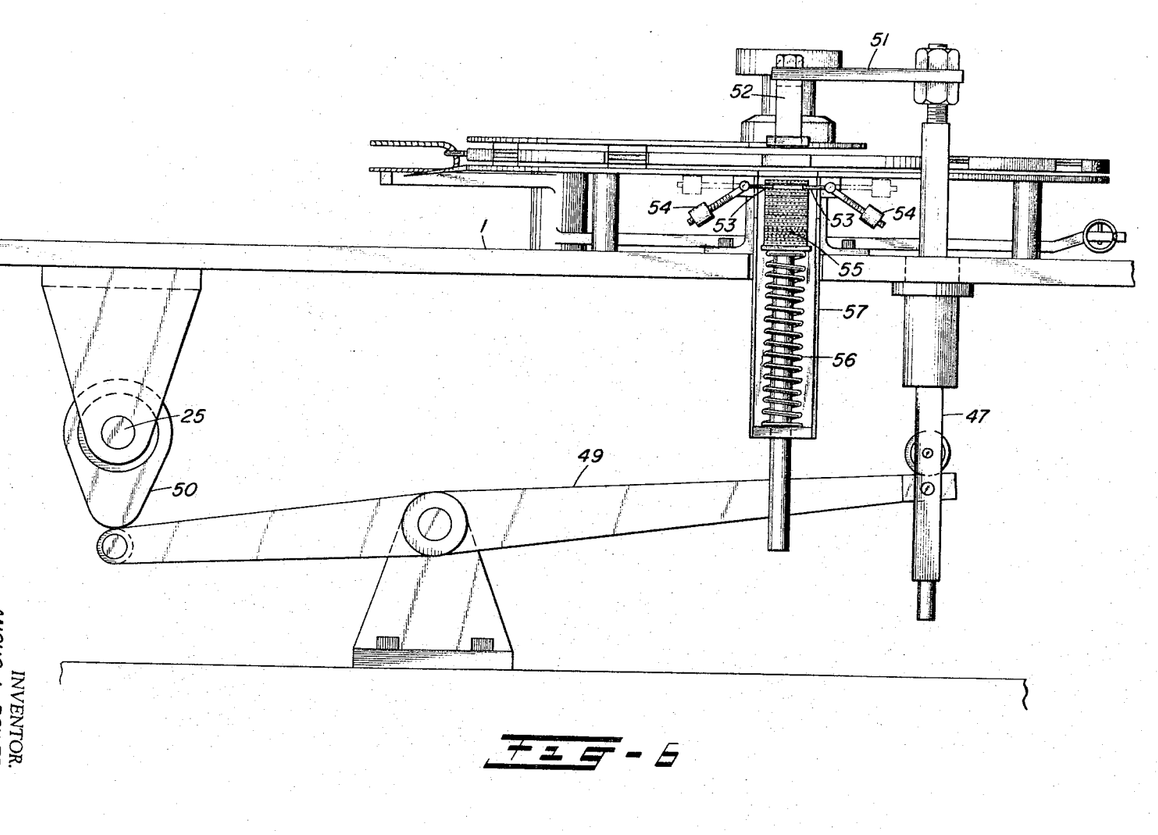
FIG. 6 is an elevation showing the unloading mechanism.

The sequence described above are repeated until station 12 of the indexing table is reached. The rod 47, (see FIGS. 1 and 6), is moved up against the pressure of the spring 48. This is effected by the pivoted lever or crank 49, which is operated by a cam 50 on the cross shaft 25. The rod 47 is connected by the plate 51 with another rod 52 above station 12. The hose supporter grip with its attached elastic drops and the rod 52 then moves down. This serves also to move fingers 53 with counterbalancing weights 54, as shown in FIG. 6. The grip is then pushed down onto the pile of grips 55 against the pressure of the spring 56. Sideways movement is prevented by the walls of the unloading compartment 57. As the rod 52 rises under pull from the spring 48, the weights 54 drop down, swinging the retaining fingers 53 into engagement so that the stack of grips is not pushed up by the spring 56 during movement of the indexing table to bring the next station into registry.

With the twelve-station table, after twelve movements, that is to say one revolution of the table, the machine is stopped by a conventional limit switch, (not shown). The unloading operator then removes the dozen supporter grips, fastens them, for example by means of an elastic band, and places them in a shipping bin. The machine is then started up and the cycle repeated for the next dozen grips.

Speed of operation, even with two operators, is many times that possible with manual operation, and all of the hose supporters are accurately provided with perfectly dimensioned and folded elastic webbing. However, as described, two operators are used and even though the saving in labor over manual operation is very great, the speed with which the machine can be operated is primarily determined by the speed with which the loading operator can place grips into position to be pushed into the respective compartments of the different stations as they pass the loading point. Therefore, it is possible to further speed up the operation and to eliminate one operator entirely. This modification is shown in FIG. 9. The portions of the indexing table, loading pusher and the like, being the same as in the foregoing figure. Instead of placing the grips into the loading channel by hand, however, they are all contained in a hopper 58 from which a chute 59 extends down to just above the loading channel for the grips. The hopper and aligning mechanisms to cause the grips to move down the chute 59 in proper alignment are well known and are not shown in detail, as the particular mechanisms form no part of the present invention so long as they are properly attached to the machine of the present invention to feed the hose grips into the loading channel.

With the automatic feed from the hopper, the machine can be operated at a considerably higher rate of speed, which is determined only by the time required by the unloading operator to remove each dozen grips. This not only reduces the labor in half from the start but also permits a more effective utilization of the unloading operator who is no longer slowed up by the rate at which a loading operator can place grips into the loading channel. Therefore, for maximum productivity the automatic feed has many practical advantages and constitutes the preferred embodiment. It should be understood, however, that the saving in time with manual feed over all-manual operation is very much greater than the additional saving when automatic feed is used. Automatic feed hoppers are quite expensive and therefore for certain operations, particularly where different sizes or styles of grips are to be provided with elastic webbing in relatively shorter runs, it may be desirable to operate with manual loading. This is largly an economic question, and it is an advantage of the present invention that great savings in time and complete uniformity in quality can be obtained with or without automatic feed.

In the drawings there has been described a preferred form of machine with all-mechanical drives and with an extremely simple and cheap step-by-step advancement of the indexing table. Equivalent drive, for example a Geneva movement, for the indexing table, electrical operation of part or all of the operations and the like, may be used and are included. However, the all-mechanical operation is so much more rugged and reliable that it constitutes the preferred modification of the invention.

I claim:

1. A machine for automatic inserting and aligning of fabric webbing in articles having a slot for receiving said webbing comprising in combination:
   (a) an indexing table provided with a plurality of stations, each station comprising a recessed compartment in the periphery of the table and having a bottom portion extending only part way to the end, whereby an opening is provided underneath the slot portion of the article,
   (b) means for advancing periodically the table from station to station,
   (c) a feed guide aligned with the table and means operated in synchronism with table movement to move articles from the guide into a station recess in the table when the latter is aligned with the guide,
   (d) means for holding a roll of webbing and for aligning the end of webbing in the plane of the table,
   (e) means actuated between periodic station movements for advancing a predetermined length of webbing over the slot in a station recess and beyond it,
   (f) means actuated synchronously at the end of the advancing to force the portion of the webbing extending beyond the slot through the slot, said means including a stiff forcing member moving downwardly through the slot and return,
   (g) means actuated at the end of the withdrawal of the stiff member from the slot to fold the end of webbing forced through the slot back parallel to the remaining part of the webbing,
   (h) means for severing the predetermined length of webbing,
   (i) means effective during further intermittent movement of the indexing table to hold the folded webbing in folded position,
   (j) means at the final station of the indexing table for removing the article with the webbing folded through its slot and for maintaining it in folded position, and
   (k) means for interrupting machine operation after a predetermined number of stations and permitting manual removal of the articles in a unitary assembly.

2. A machine according to claim 1 including a feed hopper and means for feeding articles from the hopper into the guide in predetermined orientation and in synchronism with the operation of the means for transferring the articles from the inlet guide to the recess in the indexing table.

3. A machine according to claim 1 dimensioned and contoured to receive hose grips.

4. A machine according to claim 2 dimensioned and contoured to receive hose grips.

5. A machine according to claim 3 comprising further web-holding means, clamping the web during the operation, passing the end of the web through the slot and severing the web, said means being actuated in synchronism with indexing table movement so that the clamping means is released after severance and during operation of the web-advancing means.

6. A machine according to claim 1 in which all of the means are mechanically driven and, with the exception of the means for intermittently moving the indexing table from station to station, are effected by cams and levers against spring pressure.

7. A machine according to claim 1 in which the web-advancing means is adjustable to provide for different lengths of web advance, the adjusting means being substantially self-locking.

References Cited

UNITED STATES PATENTS

| | | | |
|---|---|---|---|
| 2,955,730 | 10/1960 | Sonntag et al. | 223—49 X |
| 3,033,728 | 5/1962 | Block et al. | 223—49 X |
| 3,150,804 | 9/1964 | Edelman | 223—49 |

JORDAN FRANKLIN, *Primary Examiner.*

G. V. LARKIN, *Assistant Examiner.*